United States Patent [19]

Ohba

[11] Patent Number: 5,070,174

[45] Date of Patent: Dec. 3, 1991

[54] POLYAMIDE EPOXY ESTER RESIN, PROCESS FOR PREPARATION THEREOF AND COATING COMPOSITION

[75] Inventor: Kaoru Ohba, Susono, Japan

[73] Assignee: The Dow Chemical Company, Midland, Mich.

[21] Appl. No.: 635,797

[22] Filed: Dec. 31, 1990

Related U.S. Application Data

[63] Continuation of Ser. No. 516,008, Apr. 27, 1990, abandoned.

[30] Foreign Application Priority Data

Apr. 28, 1989 [JP]  Japan .................................. 1-107799

[51] Int. Cl.$^5$ ........................ C08G 59/44; C08L 63/02
[52] U.S. Cl. ................................ 528/104; 528/111.3; 525/488; 525/514
[58] Field of Search ............................ 528/104, 111.3

[56] References Cited

U.S. PATENT DOCUMENTS

| | | | |
|---|---|---|---|
| 2,970,972 | 2/1961 | Wear et al. ................ | 528/111.3 X |
| 3,219,602 | 11/1965 | Scheibli ...................... | 528/111.3 |
| 3,308,076 | 3/1967 | De Lia et al. .............. | 528/111.3 X |
| 3,374,193 | 3/1968 | Tsatsos et al. ............. | 528/111.3 X |
| 3,888,808 | 6/1975 | Downs et al. ............... | 528/111.3 X |
| 4,107,116 | 8/1978 | Rieu et al. .................. | 528/111.3 |
| 4,119,595 | 10/1978 | Bauer et al. ................. | 260/21 |
| 4,141,865 | 2/1979 | Bogan ........................... | 528/111.3 X |
| 4,421,906 | 12/1983 | Waddill et al. ............. | 528/111.3 X |
| 4,476,259 | 10/1984 | Kordomenos ............... | 528/104 X |
| 4,478,985 | 10/1984 | Bekooij et al. ............. | 528/111.3 X |
| 4,508,868 | 4/1985 | Whyzmuzis et al. ...... | 524/607 |
| 4,596,861 | 6/1986 | Sheih et al. ................. | 528/104 X |
| 4,602,053 | 7/1986 | Huybrechts et al. ...... | 523/436 X |
| 4,683,262 | 7/1987 | Whyzmuzis et al. ...... | 524/608 |
| 4,722,963 | 2/1988 | Whyzmuzis et al. ...... | 524/606 |
| 4,786,666 | 11/1988 | Cecil et al. .................. | 523/427 |

FOREIGN PATENT DOCUMENTS

| | | | |
|---|---|---|---|
| 569227 | 1/1959 | Canada ........................ | 528/111.3 |
| 758146 | 10/1956 | United Kingdom ....... | 528/111.3 |

OTHER PUBLICATIONS

Computer printout from Dewert data base of abstract of JP-59-126471-A & JP-63-020311-A.

Primary Examiner—Earl Neilsen

[57] ABSTRACT

Disclosed in a polyamide epoxy ester resin having a weight average molecular weight of 1,000 to 100,000, an epoxy equivalent of 500 to 10,000, and an acid value of not greater than 10, which is prepared by reacting (i) at least one epoxy resin which is a glycidyl ether of a dihydric phenol,
(ii) at least one dihydric phenol and
(iii) a polyamide dicarboxylic acid having an amine value of not greater than 20 and an acid value of at least 20, which is prepared by reacting a polymerized fatty acid composed mainly of a dimer acid with a diamine at a polymerized fatty acid/diamine molar ratio of from 2/1.0 to 2/1.9, at a ratio of such that the amount of the polyamide dicarboxylic acid segment in the resin ranges 1 to 30 percent by weight based on the weight of the resin.

Also, disclosed are a process for preparing the polyamide epoxy ester resin and a coating composition comprising the resin. The coating composition is particularly useful for can coating.

10 Claims, No Drawings

POLYAMIDE EPOXY ESTER RESIN, PROCESS FOR PREPARATION THEREOF AND COATING COMPOSITION

CROSS-REFERENCE TO RELATED APPLICATION

This is a continuation of application Ser. No. 516,008 filed Apr. 27, 1990, now abandoned.

BACKGROUND OF THE INVENTION

The present invention relates to a novel polyamide epoxy ester resin, a process for the preparation thereof, and a coating composition comprising the polyamide epoxy ester resin.

The polyamide epoxy ester resin of the present invention is useful as a coating resin to be applied where strong adhesiveness, greater pliability, and high corrosion resistance are required. The resin of the present invention is especially useful for coating a steel sheet coil to be subjected to draw-forming or shearing, and particularly for coating the inner surface of a can such as a food can or beverage can.

In the canned products industry, producers all over the world tend to follow Title 21 of the Code of Federal Regulation (21 CFR) regulation by the Food and Drug Administration (FDA) of the United States as the standard for inner surface paints for food cans and beverage cans. For epoxy resin coating compositions, usable curing agents, catalysts and additives are strictly restricted by 21 CFR 175.300(b)(3)(viii).

Heretofore, high-molecular-weight epoxy resins esterified with a vegetable oil fatty acid have been used for improving the pliability and processability of inner surface coatings of cans. However, these resins have an unsatisfactory workability and pliability.

Modification of epoxy resins with a polymerized fatty acid (dimer acid) gives an excellent curing characteristic, workability, pliability and adhesiveness. This polymerized fatty acid itself is not listed as an epoxy resin additive in 21 CFR. On the other hand, a polyamide obtained from a dimer acid and a diamine is listed in 21 CFR 175.300(b)(3)(viii), and thus a polyamide amine is used as a curing agent. The polyamide amine, however, has a poor compatibility with an epoxy resin and the pot life of the obtained using the epoxy resin paint is short. Accordingly, the polyamide is currently used as an ingredient for a two-pack type paint.

An object of the present invention is to provide a modified epoxy resin for a coating composition prepared from materials listed in regulation 21 CFR 175.300(b)(3)(viii), which has a coating performance equivalent to, or better than, that of a dimer acid-modified epoxy resin.

Another object of the present invention is to provide a modified epoxy resin which has paint stability and curing characteristics equivalent to, or better than, those of a conventional epoxy resin.

Still another object of the present invention is to provide a process for the preparation of such a modified epoxy resin and a coating composition comprising such a resin.

SUMMARY OF THE INVENTION

According to one aspect of the present invention, there is now provided a polyamide epoxy ester resin having a weight average molecular weight of 1,000 to 100,000, preferably 20,000 to 50,000, an epoxy equivalent of 500 to 10,000, preferably 1,000 to 5,000, and an acid value not greater than 10, preferably not greater than 5, which is prepared by reacting (i) at least one epoxy resin which is a glycidyl ether of a dihydric phenol;
(ii) at least one dihydric phenol; and
(iii) a polyamide dicarboxylic acid having an amine value not greater than 20, preferably not greater than 5, and an acid value of at least 20, preferably at least 50, which is prepared by reacting a polymerized fatty acid derived from a dimer acid with a diamine at a polymerized fatty acid/diamine molar ratio of from 2/1.0 to 2/1.9, preferably 2/1.05 to 2/1.2 (an equivalent ratio of from 1/1.0 to 1/1.9, preferably from 1/1.05 to 1/1.2), at a ratio such that the amount of the polyamide dicarboxylic acid segment in the resin ranges 1 to 30 percent by weight, preferably 5 to 20 percent by weight, based on the weight of the resin.

Another aspect of the present invention relates to a process for preparing the polyamide epoxy ester resin as mentioned above.

Still another aspect of the present invention relates to a coating composition comprising the polyamide epoxy ester resin as mentioned above.

DETAILED DESCRIPTION OF THE INVENTION

The polyamide epoxy ester resins of the present invention have a weight average molecular weight of 1,000 to 100,000, an epoxy equivalent of 500 to 10,000 and acid value of not greater than 10. If the weight average molecular weight of the resin is less than 1,000 or the epoxy equivalent of the resin is less than 500, the concentration of the secondary hydroxyl group in the resin decreases. The resin's secondary hydroxyl groups are believed to contribute to the resin's adhesiveness property and if the concentration of the resin's/secondary hydroxyl groups decrease, the resin exhibits poor adhesives. If the weight average molecular weight of the resin exceeds 100,000 or the epoxy equivalent of the resin exceeds 10,000, the viscosity of paint formed from the resin is too high and the paint has poor practical utility. Moreover, when the adhesiveness of the resin is reduced, peeling or other problems arise during use of the resin. If the acid value exceeds 10 in the polyamide epoxy ester resin, when the resin is used as a paint, the extractability of the formed coating with water and an organic solvent is increased, and thus the paint is not suitable as a paint for cans.

Suitable epoxy resins, component (i), which can be used in the present invention include, for example, bisphenol type liquid epoxy resins preferably having a weight average molecular weight of 340 to 500 and an epoxy equivalent of 190 to 220. Such epoxy resins are well described in the art for example, "The Handbook of Epoxy Resins" by H. Lee and K. Neville, published in 1967 McGraw-Hill, New York. The teachings of the book are incorporated herein in their entirety by reference thereto.

Suitable epoxy resins which be used in the present invention may be represented by the general formula:

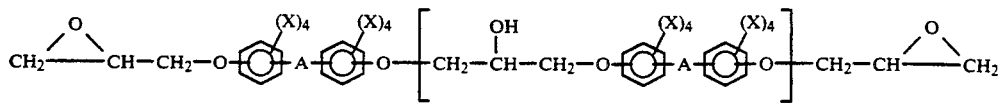

wherein each A is independently a divalent hydrocarbon group having from 1 to 8 carbon atoms,

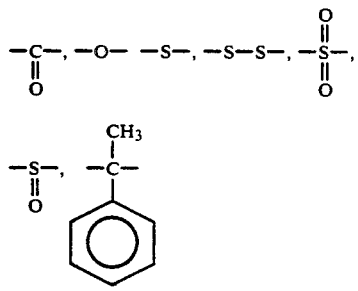

or a covalent bond: each X is independently hydrogen, halogen or an alkyl group of 1 to 4 carbon atoms and n has an average value of 0 to 1 depending on the desired molecular weight of epoxy resin. The epoxy resins can be prepared from epichlorohydrin and a dihydric phenol. Preferred epoxy resins useful in the present invention are diglycidyl ethers of bisphenol A, bisphenol F, bisphenol K and bisphenol AD. The most preferred epoxy resins useful in the present invention are D.E.R ™ 383 and D.E.R ™ 331 (trademarks of The Dow Chemical Company) available from The Dow Chemical Company.

Suitable dihydric phenols, component (ii), which can be used in the present invention include, for example, bisphenols such as those represented by the formula:

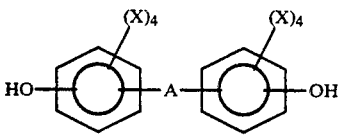

wherein X and A are as defined above. Particularly suitable dihydric phenols which can be used in the present inventions are bisphenol A, bisphenol F, bisphenol K and bisphenol AD.

Preferably, components (i) and (ii) are used herein in an amount so as to provide a weight ratio of components (i) to (ii) of from 60:40 to 100:0, more preferably from 90:30 to 90:70.

Suitable polyamide dicarboxylic acid, component (iii), which can be used in the present invention preferably have an amine value of not greater than 20 and an acid value of at least 20. If the amine value of the acid exceeds 20, the viscosity of paint prepared using the acid is too high. If the acid value of the acid is less than 20, the molecular weight of the polyamide is very high (for example, the weight average molecular weight is 10,000 or higher), and the compatibility of the polyamide with an epoxy resin or an organic solvent is poor when said combination will be used for a paint.

The polyamide dicarboxylic acid can be prepared by subjecting a polymerized fatty acid composed mainly of a dimer acid as major component to an amidation reaction at a polymerized fatty acid/diamine molar ratio of from 2/1 to 2/1.9. The terminal groups of the polyamide dicarboxylic acid differ from those of a polyamide amine usually used as a curing agent for an epoxy resin. Namely, in the usual curing agent polyamide amine, the dimer acid/polyamine molar ratio is from 1/1 to ½ (equivalent ratio of from ¼ to ¼ ) at the reaction, and therefore, the terminal groups consist of amine groups. On the other hand, in the polyamide dicarboxylic acid used in the present invention, the dimer acid/diamine molar ratio is from 2/1 to 2/1.9 (equivalent ratio of from 1/1 to 1/1.9), and therefore, the terminal groups consist of carboxylic acid groups.

If the polymerized fatty acid/diamine molar ratio is higher than 2/1.0, the carboxyl group concentration is higher than the amide group concentration and the resultant resin from the amidation reaction is regarded as a polymerized fatty acid rather than as a polyamide. If the reaction is carried out at the above molar ratio lower than 2/1.9, it is, theoretically, impossible to synthesize a polyamide dicarboxylic acid having an amine value not greater than 20 and an acid value of at least 20.

The term "dimer acid" refers to a dimer of an unsaturated fatty acid. In general, the polymerized fatty acid contains a small amount (up to 10 percent) of a monomer and/or trimer. The unsaturated fatty acids include a carboxylic acid compound having 12 to 24 carbon atoms (inclusive of the carbon atom of the carboxyl group), preferably 16 to 18 carbon atoms, and at least one unsaturated bond in the molecule. Examples of the fatty acids useful in the present invention include fatty acids having one unsaturated bond such as oleic acid, elaidic acid and cetoleic acid: fatty acids having two unsaturated bonds such as sorbic acid and linoleic acid: and fatty acids having at least three unsaturated bonds such as linoleic acid and arachidic acid. In the present invention, commercially available polymerized acids such as Haridimer ™ 300 and Haridimer ™ 200 (trademarks of Harima Kasei Kogyo: supplied by the same company), and Varsidam ™ 288 (trademark of Henckel-Hakusuisha: supplied by the same company) can be used.

Suitable diamines which can be used in the present invention are those listed in 21 CFR 175.300 (b)(3)(viii)(b), for example, ethylene diamine, 4,4'-methylene dianiline and N-oleyl-1,3-propane diamine.

The reaction between the polymerized fatty acid and the diamine can be carried out by a known polymerization process. In general, a mixture of a polymerized fatty acid composed mainly of a dimer acid and a diamine is heated at a temperature of 120° to 250° C. in a reaction vessel equipped with a device for removing water which is formed as a by-product during the amidation reaction. The reaction vessel is provided with a distillation column or a condenser and a water-separating tube as the water-removing device. Typically, in a nitrogen current, the temperature of the reaction marked is gradually increased from room temperature to 100° to 120° C. over a period of 1 to 1.5 hours, to avoid evaporation of the amine monomer, and the reaction mixture is maintained at this temperature for 0.5 to 1 hour to effect the reaction. Then, the temperature of the reaction material is increased to 200° to 250° C. for 1 to 1.5 hours and the reaction is carried out for 1.0 to 3.0 hours.

If polyamide dicarboxylic acid synthesized according to the above method is dissolved in an inert organic solvent having a boiling point higher than 130° C., the handling of the polyamide dicarboxylic acid at the subsequent steps becomes easier. An example of an organic solvent well know is Solvesso TM 100 (trademark of Esso Standard: available from the same company) which is a mixture of hydrocarbons.

In the present invention, the polyamide dicarboxylic acid, component (iii), is used as the means for introducing a dimer acid skeleton into the epoxy resin. The amide bond has a large polarity and increases the cohesive force of the coating or the coating strength. However, the amide bond has an adverse influence on the solubility of polyamide dicarboxylic acid in an organic solvent. Thus, the greater the amide group concentration becomes, the more difficult the uniform dissolution becomes. Accordingly, if the proportion of polyamide dicarboxylic acid segments in the polyamide epoxy ester resin is larger than 30 percent, the amide group concentration is increased and it is difficult to obtain a uniform paint using the resin. Furthermore, a soft coating is obtained using a resin having a fatty acid skeleton concentration which is high, the obtained coating is soft and the coating is easily damaged during various working operations. Therefore, paint prepared from said resin is not suitable as a paint for an inner surface of a can, for which a high safety factor is required. If the proportion of the polyamide dicarboxylic acid segments is smaller than 1 percent, a resin having properties advantageous over the properties of a fatty acid-modified epoxy resin can not be obtained.

The polyamide epoxy ester resin of the present invention can be prepared by any of the following processes:

(a) A process comprising reacting a bisphenol type liquid epoxy resin with a bisphenol at a solid concentration of 70 to 100 percent in the presence of a catalyst at a temperature of 120° to 200° C., and subjecting the resultant bisphenol type solid epoxy resin having an epoxy equivalent of 500 to 5,000 and a weight average molecular weight of 2,000 to 50,000 to esterification polymerization with a polyamide dicarboxylic acid as set forth above at a solid concentration of 60 to 100 percent.

(b) A process comprising reacting a bisphenol type liquid epoxy resin with a polyamide dicarboxylic acid as set forth above at a solid concentration of 80 to 100 percent at a temperature of 120° to 200° C., and subjecting the obtained semi-solid or liquid polyamide epoxy ester resin having an acid value not greater than 5, an epoxy equivalent of 180 to 300 and a weight average molecular weight of 500 to 3,000 to etherification polymerization with a bisphenol at a solid concentration of 60 to 100 percent in the presence of a catalyst at a temperature of 120° to 200° C.

(c) A process comprising condensing a bisphenol with a polyamide carboxylic acid as set forth above at a solid concentration of 80 to 100 percent at a temperature of 120° to 200° C., and subjecting the obtained polyamide bisphenol ester resin having an acid value not greater than 5 and a weight average molecular weight of 500 to 3,000 to etherification polymerization with a bisphenol type liquid epoxy resin at a solid concentration of 60 to 100 percent in the presence of a catalyst at a temperature of 120° to 200° C.

(d) A process comprising condensing a bisphenol type liquid epoxy resin, a bisphenol and a polyamide dicarboxylic acid as set forth above at a solid concentration of 60 to 100 percent at a temperature of 120° to 200° C.

In the above-mentioned processes (a) through (d), the reaction time is generally short and may be 3 to 15 hours, although the reaction time may be changed according to the reaction temperature, the solid concentration, the amount added of the catalyst and the like. The reaction may be carried out in a closed system or with refluxing under normal pressure. The reaction can be carried out in air, but preferably is carried out in an inert gas atmosphere, for example, in a nitrogen current. In the above-mentioned process (c) and (d), since water is formed as a by-product by the condensation reaction, the reaction is preferably carried out by using a reaction apparatus equipped with a device capable of removing water.

In the process (a), the bisphenol type solid epoxy resin can be obtained by reacting a bisphenol type liquid epoxy resin with a bisphenol. Alternatively, commercially available solid epoxy resins having an epoxy equivalent of 300 to 3,500, can be used. Examples of the resins used herein are Epikote TM 1001 and Epikote TM 1007 (trademarks of Yuka Shell Epoxy: available from the same company) and D.E.R. TM 661, D.E.R. TM 664 and D.E.R. TM 669 (trademarks of The Dow Chemical Company: available from the same company).

Suitable solvents which can be used in the polymerization reaction system in the processes (a) through (d), include inert solvents having a good compatibility with an epoxy resin and a boiling point higher than 130° C., especially higher than 140° C. Examples of the solvents used herein are glycol type solvents such as ethylene glycol and propylene glycol: glycol monoether type solvents such as ethylene glycol monoethyl ether and ethylene glycol monobutyl ether; acetate type solvents such as propylene glycol monomethyl ether acetate and butyl acetate: alcohol type solvents such as amyl alcohol and cyclohexanol: ketone type solvents such as cyclohexanone and diisobutylketone: and aromatic solvents such as xylene and Solvesso TM 100 (supplied by Esso Standard). Of these solvents, an acetate type solvent, a ketone type solvent, and an aromatic non-alcoholic solvent are especially preferred. These solvents can be used singly or as a mixture of two or more thereof. Where a carboxyl group is present in the reaction system, if a cellosolve type solvent or alcoholic solvent having a hydroxyl group is used at a high concentration, an esterification reaction occurs between the solvent and the carboxyl group and the amount of the formed oligomer is increased. Accordingly, the amount of solvent used herein is preferably not greater than 5 percent by weight based on the total solids.

A coating composition can be prepared by using the polyamide epoxy ester resin of the present invention. The coating composition may comprise the polyamide epoxy ester resin and a curing agent at a weight ratio of from 70/30 to 95/5, preferably from 80/20 to 95/5, and further comprises 500 to 50 parts by weight, preferably 400 to 100 parts by weight of an organic solvent, per 100 parts by weight of the total solids (the total weight of the modified epoxy resin and curing agent) in the composition. Suitable curing agents which can be used herein (include, for example, melamine formaldehyde, phenol formaldehyde, urea formaldehyde, allyl ether monomethylol phenol, allyl ether dimethylol phenol, allyl ether trimethylol phenol, 4,4'-sec-butylidene diphenol formaldehyde and 4,4'-isopropylidene diphenol formaldehyde.

Other preferred curing agents which can be used herein include, for example, linear aliphatic amines such as ethylene diamine and N-oleyl-1,3-propane diamine: cyclic amines such as menthane diamine, isophorone diamine, bis(4-amino-3-methyldicyclohexyl)methane, diaminodicyclohexyl-methane and bis(aminomethyl)cyclohexane: aliphatic aromatic amines such as m-xylene diamine: and aromatic amines such as metaphenylene diamine, 4,4'-methylene dianiline, diaminodiphenyl sulfone and diaminodiethyl-diphenyl methane.

Suitable solvents which can be used herein include, for example, the above-mentioned glycol type, acetate type, alcohol type, ketone type and aromatic solvents.

In some cases, the above-mentioned coating composition may further comprise additives, for example, flow control agents such as polyvinyl butyral, silicone oil, silicone resin and fluorocarbon.

The above-mentioned coating composition is effectively used in applications where a strong adhesiveness, high pliability, and high corrosion resistance are required, particularly for coating a coil of a steel sheet to be subjected to draw-forming or shearing, and especially for coating the inner surfaces of cans such as food cans and drink cans.

EXAMPLES

The present invention will now be described in detail with reference to the following examples, that by no means limit the scope of the invention. In the examples, all of the percentages and parts are by weight unless otherwise indicated.

In the examples, the weight average molecular weight, acid value, epoxy equivalent, and amine value of the resin were determined by the following methods.

Weight Average Molecular Weight. The weight average molecular weight measurement of the resin was based on the calibration curve of reference polystyrene (supplied by Showa Denko) by gel permeation chromatography (using a polystyrene column).

Acid Value. The acid value of the resin was determined as follows: A polyamide dicarboxylic acid or polyamide epoxy ester resin was dissolved in tetrahydrofuran (THF)/methylene chloride (1/5), and the titration was carried out with an N/10 ethanol solution of KOH by using Phenol Phthalene as the indicator. The acid value was given by the following formula:

Acid Value = (56.11/10 × A)/W wherein A stands for the amount (ml) of the KOH solution required for the titration, and W stands for the weight (g) of the solid of the polyamide dicarboxylic acid or polyamide epoxy ester resin.

Amine Value. The amine value of the resin was determined as follows: The polyamide dicarboxylic acid or polyamide epoxy ester resin was dissolved in THF and the titration was carried out with an N/50 aqueous solution of HCl by using Bromophenol Blue as the indicator. The amine value was given by the following formula:

Amine Value = (56.11 × A × 0.02)/W wherein A stands for the amount (ml) of the N/50 aqueous solution of HCl required for the titration, and W stands for the weight (g) of the solid of the polyamide carboxylic acid or polyamide epoxy ester resin.

Epoxy Equivalent. The epoxy equivalent of the resin was measured according to JIS K-7236.

Note, methylene chloride was used as the solvent for dissolving the polyamide epoxy ester resin.

Polyamide Dicarboxylic Acid Synthesis Example 1

A reaction vessel was charged with 947 parts of C36-dimer acid [Haridimer TM 300 (marketed by Harima Kasei Kogyo) monomer=1 percent, dimer=97 percent, trimer=2 percent, acid value=195] and 53 parts of ethylene diamine, and the reaction was carried out in a nitrogen current at 60° C. for 30 minutes in the absence of a catalyst. Then the temperature was elevated to 120° C. over a period of 1 hour by heating, and the reaction mixture was maintained at this temperature for about 30 minutes. The temperature was then elevated to 240° C. over a period of 1 hour by heating, and the reaction mixture was maintained at this temperature for 2 hours and naturally cooled to room temperature, and accordingly, 968 parts of a polyamide carboxylic acid having an amine value of 1 and an acid value to 91 were obtained. The polyamide carboxylic acid was diluted to a solid content of 50 percent by weight with Solvesso TM 100 to obtain a 50 percent polyamide dicarboxylic acid solution (hereinafter referred to as "polyamide dicarboxylic acid solution A"). In this polyamide dicarboxylic acid solution A, the amount of the units derived from dimer acid corresponded to about 45 percent by weight (about 90 percent based on the solid).

Polyamide Dicarboxylic Acid Synthesis Example 2

A reaction vessel was charged with 830 parts of Haridimer TM 300 and 170 parts of 4,4'-methylene dianiline, and the reaction was carried out in a nitrogen current at 60° C. for 30 minutes in the absence of a catalyst. Then the temperature was elevated to 120° C. over a period of 1 hour by heating, and the reaction mixture was maintained at this temperature for about 30 minutes. The temperature was then elevated to 240° C. over a period of 1 hour by heating, and the reaction mixture was maintained at this temperature for 2 hours and naturally cooled to room temperature to obtain a polyamide carboxylic acid having an amine value of 2 and an acid value of 69. The polyamide carboxylic acid was diluted with Solvesso TM 100 to a solid concentration of 50 percent by weight, to obtain a 50 percent polyamide dicarboxylic acid solution (hereinafter referred to as "polyamide dicarboxylic acid solution B"). In this polyamide dicarboxylic acid solution B, the amount of the units derived from the dimer acid corresponded to about 41.5 percent by weight (about 83 percent based on the solid).

EXAMPLE 1

A reaction vessel was charged with 500 parts of liquid epoxy resin D.E.R. TM 383 (liquid epoxy resin marketed by The Dow Chemical Company: epoxy equivalent = 176 to 183, viscosity = 9,000 to 10,500 cst at 25° C.), 283 parts of bisphenol A, 210 parts of Solvesso TM 100, and 0.5 parts of ethyltriphenyl phosphonium phosphate, the charge was heated at 160° C. in a nitrogen current, and the reaction was carried out for about 1 hour (when a part of the formed epoxy resin was sampled and analyzed, it was found that the weight average molecular weight was 14,000 and the epoxy equivalent was 2,700). Then 118 parts of the polyamide dicarboxylic acid solution A were added to the reaction mixture, the reaction was carried out at 160° C. for about 3.5 hours, 842 parts of cyclohexanone, 842 parts of propylene glycol methyl ether acetate and 573 parts of Solvesso ™ 100 were added to the reaction mixture, and the mixture was cooled to obtain a 25 percent solution (having a viscosity of 540 cst at 25° C.) of a polyamide epoxy ester resin having an acid value smaller than 1, an epoxy equivalent of 4,400, and a weight average molecular weight of 41,000.

EXAMPLE 2

A reaction vessel was charged with 500 parts of a liquid epoxy resin D.E.R. ™ 383, 290 parts of bisphenol A, 158 parts of Solvesso ™ 100, and 0.5 parts of ethyltriphenyl phosphonium phosphate, the charge was heated at 160° C. in a nitrogen current, and the reaction was carried out for about 2 hours (when a part of the formed epoxy resin was sampled and analyzed, it was found that the weight average molecular weight was 19,000 and the epoxy equivalent was 3,500). Then 50 parts of the polyamide dicarboxylic acid solution A was added to the reaction mixture, the reaction was carried out at 160° C. for about 2 hours, 815 parts of cyclo-hexanone, 815 parts of propylene glycol methyl ether acetate, and 632 parts of Solvesso ™ 100 were added to the reaction mixture, and the mixture was cooled to obtain a 25 percent solution (having a viscosity of 670 cst at 25° C.) of a polyamide epoxy ester resin having an acid value smaller than 1, an epoxy equivalent of 4,300, and a weight average molecular weight of 49,000.

EXAMPLE 3

A reaction vessel was charged with 500 parts of solid epoxy resin D.E.R. ™ 667 (solid epoxy resin marketed by The Dow Chemical Company: epoxy equivalent = 1600 to 2000, a softening point of 120° to 135° C.), 100 parts of Solvesso ™ 100, and 140 parts of the polyamide dicarboxylic acid solution A, the charge was heated at 160° C. in a nitrogen current, and the reaction was carried out for 1.5 hours. Then 1140 parts of ethylene glycol monobutyl ether and 400 parts of Solvesso ™ 100 were added to the reaction mixture, and the mixture was cooled to obtain a 25 percent solution (having a viscosity of 680 cst at 25° C.) of a polyamide epoxy ester resin having an acid value not greater than 1, an epoxy equivalent of 4,800, and a weight average molecular weight of 51,000.

EXAMPLE 4

A reaction vessel was charged with 500 parts of liquid epoxy resin D.E.R. ™ 383 and 118 parts of the polyamide dicarboxylic acid solution A, the charge was heated at 180° C. in a nitrogen current, and the reaction was carried out for about 2 hours. When a part of the formed polyamide epoxy ester resin was sampled and analyzed, it was found that the epoxy equivalent was 205 and the acid value was not greater than 1. Then 210 parts of Solvesso ™ 100, 283 parts of bisphenol A and 0.5 part of ethyltriphenyl phosphonium phosphate were added to the obtained resin, the reaction was carried out at 160° C. for 3 hours, 842 parts of cyclohexanone, 842 parts of propylene glycol methyl ether acetate, and 573 parts of Solvesso ™ 100 were added to the reaction mixture, and the mixture was cooled to obtain a 25 percent solution (having a viscosity of 580 cst at 25° C.) of a polyamide epoxy ester resin having an acid value not greater than 1, an epoxy equivalent of 4,000, and a weight average molecular weight of 46,000.

EXAMPLE 5

A reaction vessel was charged with 283 parts of bisphenol A and 118 parts of the polyamide dicarboxylic acid solution A, the charge was heated at 180° C. in a nitrogen current and the reaction was carried out for 2 hours while removing water formed as a by-product by distillation. When a part of the formed polyamide bisphenol was sampled and analyzed, it was found that the hydroxyl groups equivalent was 143. Then 500 parts of a liquid epoxy resin, 210 parts of Solvesso ™ 100, and 0.5 part of ethyltriphenyl phosphonium phosphate were added to the polyamide bisphenol, the reaction was carried out at 160° C. for 3 hours, 842 parts of cyclohexanone, 842 parts of propylene glycol methyl ether acetate, and 573 parts of Solvesso ™ 100 were added to the reaction mixture, and the mixture was cooled to obtain a 25 percent solution (having a viscosity of 650 cst at 25° C.) of a polyamide epoxy ester resin having an acid value not greater than 1, an epoxy equivalent 4,600, and a weight average molecular weight of 49,000.

EXAMPLE 6

A reaction vessel was charged with 500 parts of liquid epoxy resin D.E.R. ™ 333, 283 parts of bisphenol A, 210 parts of Solvesso ™ 100, and 0.5 part of ethyltriphenyl phosphonium phosphate, the charge was heated at 160° C. in a nitrogen current, and the reaction was carried out for about 3 hours. Then 842 parts of cyclohexanone, 842 parts of propylene glycol methyl ether acetate and 573 parts of Solvesso ™ 100 were added to the reaction mixture, and the mixture was cooled to obtain a 25 percent solution (having a viscosity of 530 cst at 25° C.) for a polyamide epoxy ester resin having an acid value not greater than 1, an epoxy equivalent of 4,200, and a weight average molecular weight of 46,000.

EXAMPLE 7

A reaction vessel was charged with 500 parts of liquid epoxy resin D.E.R. ™ 383 and 53.3 parts of the polyamide dicarboxylic acid solution B, the charge was heated at 180° C. in a nitrogen current, and the reaction was carried out for about 2 hours. When a part of the formed polyamide epoxy ester resin was sampled and analyzed, it was found that the epoxy resin equivalent was 192 and the acid value was smaller than 1. Then 180 parts of Solvesso ™ 100, 292 parts of bisphenol A and 0.5 parts of ethyltriphenyl phosphonium phosphate were added to the resin, the reaction was carried out at 160° C. for 3 hours, 819 parts of cyclohexane, 819 parts of propylene glycol methyl ether acetate, and 614 parts of Solvesso ™ 100 were added to the reaction mixture, and the mixture was cooled to obtain a 25 percent solution (having a viscosity of 540 cst at 25° C.) of a polyamide epoxy ester resin having an acid value not greater than 1, an epoxy equivalent of 4,400, and a weight average molecular weight of 53,000.

Comparative Example 1

A reaction vessel was charged with 500 parts of liquid epoxy resin D.E.R. ™ 383 and 56 parts of Haridimer ™ 300, the charge was heated at 160° C. in a nitrogen current, and the reaction was carried out for 3 hours. When a part of the formed epoxy resin was sampled and analyzed, it was found that the acid value was not greater than 1 and the epoxy equivalent was 215. Then 275 parts of bisphenol A 156 parts of Solvesso TM 100, and 0.5 parts of ethyltriphenyl phosphonium phosphate were added to the epoxy resin, the reaction was carried out at 160° 0° C. for 3 hours, 831 parts of cyclohexane, 831 parts of propylene glycol methyl ether acetate, and 675 parts of Solvesso TM 100 were added to the reaction mixture and the mixture was cooled to obtain a 25 percent solution (having a viscosity of 890 cst at 25° C.) of a dimer acid-modified epoxy resin having an acid value not greater than 1, an epoxy equivalent of 4,100, and a weight average molecular weight of 64,000.

Comparative Example 2

A reaction vessel was charged with 500 parts of liquid epoxy resin D.E.R. TM 383 and 24 parts of Haridimer TM 300, the charge was heated at 160° C. in a nitrogen current, and the reaction was carried out for 3 hours. When a part of the formed epoxy resin was sampled and analyzed, it was found that the acid value was not greater than 1 and the epoxy equivalent was 197. Then 286 parts of bisphenol A, 159 parts of Solvesso TM 100, and 0.5 parts of ethyltriphenyl phosphonium phosphate were added to the epoxy resin, the reaction was carried out at 160° C. for 3 hours, 810 parts of cyclohexanone, 810 parts of propylene glycol methyl ether acetate, and 651 parts of Solvesso TM 100 were added to the reaction mixture, and the mixture was cooled to obtain a 25 percent solution (having a viscosity of 820 cst at 25° C.) of a dimer acid-modified epoxy resin having acid value not greater than 1, an epoxy equivalent of 5,100, and a weight average molecular weight of 61,000.

Comparative Example 3

A reaction vessel was charged with 500 parts of solid epoxy resin D.E.R. TM 667 (solid epoxy resin marketed by The Dow Chemical Company: epoxy equivalent =1,600 to 2,000, weight average molecular weight=8,000 to 13,000), 100 parts of Solvesso TM 100, and 34 parts of Haridimer TM 300, the charge was heated at 160° C. in a nitrogen current, and the reaction was carried out for 3 hours. Then 534 parts of cyclohexanone, 534 parts of propylene glycol methyl ether acetate, and 434 parts of Solvesso TM 100 were added to the reaction mixture, and the mixture was cooled to obtain a 25 percent solution (having a viscosity of 540 cst at 25° C.) of a dimer acid-modified epoxy resin having an acid value not greater than 1, an epoxy equivalent of 5,000, and a weight average molecular weight of 54,000.

Comparative Example 4

A reaction vessel was charged with 500 parts of liquid epoxy resin D.E.R. TM 383, 299 parts of bisphenol A, 68 parts of Solvesso TM 100, 21 parts of xylene, and 1.5 parts of ethyltriphenyl phosphonium phosphate, the reaction was carried out at 180° C. in a nitrogen current for about 1 hour, 898 parts of ethylene glycol monobutyl ether, 877 parts of xylene and 533 parts of propylene glycol monobutyl ether acetate were added to the reaction mixture, and the mixture was cooled to obtain a 25 percent solution (having a viscosity of 600 cst at 25° C.) of a bisphenol A type solid epoxy resin having an epoxy equivalent of 5,700, and a weight average molecular weight of 50,500.

Comparative Example 5

A reaction vessel was charged with 500 parts of liquid epoxy resin D.E.R. TM 383, 299 parts of bisphenol A, 161 parts of Solvesso TM 100, and 0.5 parts of ethyltriphenyl phosphonium phosphate, and the reaction was carried out at 160° C. in a nitrogen current for 3 hours. When a part of the formed epoxy resin was sampled and analyzed, it was found that the epoxy equivalent was 4,500 and the weight average molecular weight was 39,000. Then 24 parts of Hartal TM FA-IS (tall oil fatty acid marketed by Harima Kasei: acid value=194, iodine value=135) were added to the epoxy resin, the reaction was carried out at 180° C. for 1 hour, 770 parts of ethylene glycol monobutyl ether, 770 parts of xylene, and 770 parts of propylene glycol monobutyl ether acetate were added to the reaction mixture, and the mixture was cooled to obtain a 25 percent solution (having a viscosity of 430 cst at 25° C.) of an epoxy ester resin having an epoxy equivalent of 8,500, a weight average molecular weight of 45,000, and an acid value of 1.

The resins synthesized in the examples and comparative examples are shown in Table 1.

TABLE 1

| Sample | Property under FDA | Amount (%) of Introduced Fatty Acid | Polyamide Dicarboxylic Acid Solution | Epoxy Equivalent | Weight Average Molecular Weight | Viscosity (cst), 25% 25° C. |
|---|---|---|---|---|---|---|
| Example No. | | | | | | |
| 1 | proper | 6.3% | A | 4400 | 41000 | 540 |
| 2 | proper | 2.8% | A | 4300 | 49000 | 670 |
| 3 | proper | 11.1% | A | 4800 | 51000 | 680 |
| 4 | proper | 6.3% | A | 4000 | 46000 | 580 |
| 5 | proper | 6.3% | A | 4600 | 49000 | 650 |
| 6 | proper | 6.3% | A | 4200 | 46000 | 530 |
| 7 | proper | 2.7% | B | 4400 | 53000 | 650 |
| Comparative Example No. | | | | | | |
| 1 | not proper | 6.8% | — | 4100 | 64000 | 890 |
| 2 | not proper | 2.9% | — | 5100 | 61000 | 820 |
| 3 | not proper | 6.4% | — | 5000 | 54000 | 540 |
| 4 | proper | 0% | — | 5700 | 50500 | 600 |

TABLE 1-continued

| Sample | Property under FDA | Amount (%) of Introduced Fatty Acid | Polyamide Dicarboxylic Acid Solution | Epoxy Equivalent | Weight Average Molecular Weight | Viscosity (cst), 25% 25° C. |
|---|---|---|---|---|---|---|
| 5 | proper | 3.0% | — | 8500 | 45000 | 430 |

Evaluation of Coatings

A phenol-formaldehyde type curing agent (resol) was diluted with propylene glycol methyl ether acetate to form a 25 percent dilution.

Coating compositions a through 1 were prepared by adding the above-mentioned dilution in an amount of 20 percent by weight to the 25 percent solutions prepared in Examples 1 through 7 and Comparative Examples 1 through 5.

The coating compositions were coated on phosphate-treated steel sheets having a thickness of 0.2 mm by using a bar coater, and the coatings were heated at 210° C. for 14 minutes to form samples. The coating thickness after drying was 5 μm.

The following properties of the obtained coatings were examined.

(1) Pliability Test

On a sample stand of a ball-dropping impact tester (made at Gotemba Research Institute, Dow Chemical, Japan), a coated steel sheet cut to a size of 3 cm × 3 cm was placed in a twice-folded state so that the coated surface was located on the front side. An iron weight of 2 kg was allowed to drop on to the sample from a height of 75 cm, and cracking of the coating at the folded part was checked by a method of detecting an electric current in a 1 percent aqueous solution of sodium chloride. A smaller current value indicates a greater pliability. The measured current value is by the value per 2 cm of the length of the folded part.

(2) Methylethylketone (MEK) Extraction Test

A sample was immersed for 1 hour in boiling methylethylketone, and the change (decrease) of the weight of the coating was measured.

(3) Water Extraction Test

The coating compositions a through 1 were coated on aluminum foils having a thickness of 50 μm, by a bar coater, and the coatings were dried at 200° C. for 14 minutes to prepare samples. The coating thickness after drying was 15 μm.

The coated aluminum foils were subjected to a water extraction treatment at 125° C. for 30 minutes so that the amount of distilled water was 2 cc per cm² of the coated surface, and the COD was measured according to the method of JIS 0-102.

(4) Evaluation Results

The results of the evaluation are shown in Table 2.

The dimer acid epoxy ester type coating compositions (coating compositions i and j) have a greater pliability than the coating compositions sanctioned by FDA, i.e., the fatty acid-modified epoxy coating composition (coating composition l) and the unmodified solid bisphenol A coating composition (coating composition k), and the dimer acid epoxy ester coating compositions show MEK extraction and water extraction amounts comparable to those of the sanctioned coating compositions. But, in view of FDA 21 CFR 175.300 (b)(3)(viii), the dimer acid epoxy ester resins cannot be accepted as a coating material for the inner surfaces of cans.

The coating compositions prepared by using the polyamide epoxy esters of Examples 1 through 7 (coating compositions a through g) are comparable to the dimer acid epoxy ester coating compositions in pliability and extractability with MEK and water, and these coating compositions can be accepted as a paint for the inner surfaces of cans according to FDA 21 CFR 175.300(b)(3)(viii).

TABLE 2

| Sample | Coating Composition | Pliability (mA) | MEK Extractability (%) | COD at Water Extraction (ppm) |
|---|---|---|---|---|
| Example No. | | | | |
| 1 | a | 1.18 | 19.4 | 6.3 |
| 2 | b | 1.40 | 17.9 | 5.9 |
| 3 | c | 0.59 | 18.2 | 6.0 |
| 4 | d | 1.37 | 18.9 | 5.6 |
| 5 | e | 1.22 | 20.6 | 7.3 |
| 6 | f | 1.06 | 20.1 | 6.9 |
| 7 | g | 1.28 | 18.4 | 5.7 |
| Comparative Example No. | | | | |
| 1 | h | 1.25 | 19.3 | 6.2 |
| 2 | i | 1.34 | 20.9 | 6.5 |
| 3 | j | 1.2 | 20.4 | 6.9 |
| 4 | k | 3.05 | 18.3 | 7.0 |
| 5 | l | 2.68 | 21.0 | 9.3 |

What is claimed is:

1. A polyamide epoxy ester resin having a weight average molecular weight of 1,000 to 100,000, an epoxy equivalent of 500 to 10,000 and an acid value of not greater than 10, which is prepared by reacting
   (i) at least one epoxy resin which is a glycidyl ether of a dihydric phenol,
   (ii) at least one dihydric phenol: and
   (iii) a polyamide dicarboxylic acid having an amine value of not greater than 20 and an acid value of at least 20, which is prepared by reacting a polymerized fatty acid derived from a dimer acid with a diamine at a polymerized fatty acid/diamine molar ratio of from 2/1.0 to 2/1.9,
   at a ratio of such that the amount of the polyamide dicarboxylic acid segment in the resin ranges 1 to 30 percent by weight based on the weight of the resin.

2. The resin of claim 1 wherein the epoxy resin is a glycidyl ether of bisphenol A, bisphenol F, bisphenol K or bisphenol AD.

3. The resin of claim 1 wherein the dihydric phenol is bisphenol A, bisphenol F, bisphenol K or bisphenol AD.

4. The resin of claim 1 wherein the polymerized fatty acid comprises, as main component, a dimer acid of an unsaturated fatty acid having 12 to 24 carbon atoms.

5. The resin of claim 1 wherein the diamine is ethylene diamine, 4,4'-methylene dianiline or N-oleyl-1,3-propane diamine.

6. A process for the preparation of the polyamide epoxy ester resin of claim 1, which comprises reacting a liquid epoxy resin derived from a bisphenol with a bisphenol at a solid concentration of 70 to 100 percent by weight, and subjecting the obtained solid epoxy resin having an epoxy equivalent of 500 to 5,000 and a weight average molecular weight of 2,000 to 50,000 to esterification polymerization with the polyamide dicarboxylic acid of claim 1, at a solid concentration of 60 to 100 percent by weight.

7. A process for the preparation of the polyamide epoxy ester resin of claim 1, which comprise reacting a liquid epoxy resin derived from a bisphenol polyamide dicarboxylic acid of claim 1 at a solid concentration of 80 to 100 percent by weight, and subjecting the obtained semi-solid or liquid polyamide epoxy ester resin having an acid value not greater than 5, an epoxy equivalent of 180 to 300 and a weight average molecular weight of 500 to 3,000 to etherification polymerization with a bisphenol at a solid concentration of 60 to 100 percent by weight.

8. A process for the preparation of the polyamide epoxy ester resin of claim 1, which comprises condensing a bisphenol with the polyamide carboxylic acid of claim 1 at a solid concentration of 80 to 100 percent and subjecting the obtained polyamide bisphenol ester resin having an acid value not greater than 5 and a weight average molecular weight of 500 to 3,000 to a etherification polymerization with liquid epoxy resin derived from a bisphenol at a solid concentration of 60 to 100 percent.

9. A process for the preparation of the polyamide epoxy ester resin of claim 1, which comprises condensing a liquid epoxy resin derived from a bisphenol, a bisphenol and the polyamide dicarboxylic acid of claim 1 at a solid concentration of 60 to 100 percent at a temperature of 120° to 200° C.

10. A coating composition comprising the polyamide epoxy ester resin of claim 1.

* * * * *